United States Patent
Sivakumar et al.

(10) Patent No.: US 11,843,320 B2
(45) Date of Patent: Dec. 12, 2023

(54) METHOD OF OPERATING ISOLATED RESONANT CONVERTER WITH SYNCHRONOUS RECTIFIER

(71) Applicant: Texas Instruments Incorporated, Dallas, TX (US)

(72) Inventors: Ramkumar Sivakumar, Bangalore (IN); Brent Alan McDonald, Murphy, TX (US); Yalong Li, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 61 days.

(21) Appl. No.: 17/362,875

(22) Filed: Jun. 29, 2021

(65) Prior Publication Data
US 2022/0416676 A1   Dec. 29, 2022

(51) Int. Cl.
*H02M 3/335* (2006.01)
*H02M 1/00* (2006.01)

(52) U.S. Cl.
CPC ..... *H02M 3/33592* (2013.01); *H02M 1/0035* (2021.05)

(58) Field of Classification Search
CPC ................. H02M 3/33592; H02M 1/0035
See application file for complete search history.

(56) References Cited

U.S. PATENT DOCUMENTS

| | | | | |
|---|---|---|---|---|
| 2009/0016083 A1* | 1/2009 | Soldano | ............ | H02M 3/33592 363/20 |
| 2009/0091951 A1* | 4/2009 | Yang | ................. | H02M 3/33592 363/21.06 |

* cited by examiner

*Primary Examiner* — Kyle J Moody
(74) *Attorney, Agent, or Firm* — Ray A. King; Frank D. Cimino

(57) ABSTRACT

A method for operating a resonant converter in a burst mode includes determining the polarity of a transformer voltage across a secondary winding of a transformer. The method includes determining, from the polarity of the transformer voltage, on/off states of first and second transistors coupled to the secondary winding of the transformer. If the transformer voltage has a first polarity, the method includes commencing a burst period by alternately turning on/off high-side and low-side transistors electrically connected to a primary winding of the transformer.

15 Claims, 4 Drawing Sheets

METHOD OF OPERATING ISOLATED RESONANT CONVERTER WITH SYNCHRONOUS RECTIFIER

TECHNICAL FIELD

This description relates generally to resonant power converters.

BACKGROUND

In isolated resonant power converters, as output current demand falls, the switching frequency is increased to reduce power output. However, in low-load conditions, a high switching frequency causes a drop in efficiency due to increases in switching losses concurrent with the drop in output power. Thus, in low-load conditions a low-power burst mode is employed to maintain the output voltage. The burst mode has a burst period during which high-side and low-side transistors on a primary side of the resonant converter are alternately turned on/off to generate a burst of pulses to start oscillation of the resonant converter at a level sufficient to re-charge an output capacitor. Between the burst periods (referred to as burst interval periods), the high-side and low-side transistors are turned off.

In order to rectify current on a secondary side, isolated resonant converters often include a synchronous rectifier comprising one or more transistors. Under light load conditions operating in burst mode, transistors of the synchronous rectifier on the secondary side can turn on/off independent of the transistors on the primary side. To prevent a sharp rise in current through an inductor on the primary side, it is desirable to control the start of a first pulse of the burst period based on the on/off states of the transistors of the synchronous rectifier.

SUMMARY

In one aspect, a method for operating a resonant converter in a burst mode includes determining the polarity of a transformer voltage across a secondary winding of a transformer. The method includes determining, from the polarity of the transformer voltage, on/off states of first and second transistors coupled to the secondary winding of the transformer. If the transformer voltage has a first polarity, the method includes commencing a burst period by alternately turning on/off high-side and low-side transistors coupled to a primary winding of the transformer.

In an additional aspect, the method includes turning on the low-side transistor when the second transistor is turned off, and turning off the low-side transistor before the second transistor is turned on. The method includes turning on the high-side transistor when the first transistor is turned off and turning off the high-side transistor before the first transistor is turned on.

In an additional aspect, if the transformer voltage has a second polarity, the method includes holding the resonant converter in a burst interval by delaying the start of a first pulse of the burst period.

In an additional aspect, the transformer voltage has a first polarity if the transformer voltage is in a positive half-cycle and has a second polarity if the transformer voltage is in a negative half cycle.

In an additional aspect, the first and second transistors are connected to the secondary windings of the transformer in a synchronous rectifier configuration.

In an additional aspect, a method for operating a resonant converter in a burst mode includes determining a first voltage representative of an output power delivered by the resonant converter and comparing the first voltage to a burst threshold voltage representative of a target output power. If the first voltage is less than the burst threshold voltage, the method includes determining the polarity of a transformer voltage across a secondary winding of a transformer. The method includes determining, from the polarity of the transformer voltage, on/off states of first and second transistors coupled to the secondary winding of the transformer. If the transformer voltage has a first polarity, the method includes commencing a burst period by alternately turning on/off high-side and low-side transistors coupled to a primary winding of the transformer. The method includes comparing an output voltage to an over-voltage protection threshold when the resonant converter is in the burst period. The method includes transitioning the resonant converter from the burst period to the burst interval if the output voltage is greater than the over-voltage protection threshold, and holding the resonant converter in the burst interval by delaying the start of a first pulse of the burst period if the output power is less than or equal to the over-voltage protection threshold. The method includes transitioning the resonant converter from the burst period to the burst interval after generating a predetermined number of bursts.

In an additional aspect, a method for operating a resonant converter in a burst mode includes determining a first voltage representative of an output power delivered by the resonant converter and comparing the first voltage to a burst threshold voltage representative of a target output power. If the first voltage is less than the burst threshold voltage, the method includes determining the polarity of a transformer voltage across a secondary winding of a transformer. If the transformer voltage has a first polarity, the method includes commencing a burst period by alternately turning on/off a transistor electrically connected to a primary winding of the transformer, and if the transformer voltage has a second polarity, holding the resonant converter in a burst interval by delaying the start of a first pulse of the burst period. If the first voltage is greater than the burst threshold voltage, the method includes holding the resonant converter in the burst interval.

In an additional aspect, a method for operating a resonant converter in a burst mode includes determining a first voltage representative of an output power delivered by the resonant converter and comparing the first voltage to a burst threshold voltage representative of a target output power. If the first voltage is less than the burst threshold voltage, the method includes determining the polarity of a transformer voltage across a secondary winding of a transformer. If the transformer voltage has a first polarity, the method includes commencing a burst period by alternately turning on/off high-side and low-side transistors, wherein the high-side and low-side transistors are electrically connected to a primary winding of the transformer.

DETAILED DESCRIPTION

Figure 1:
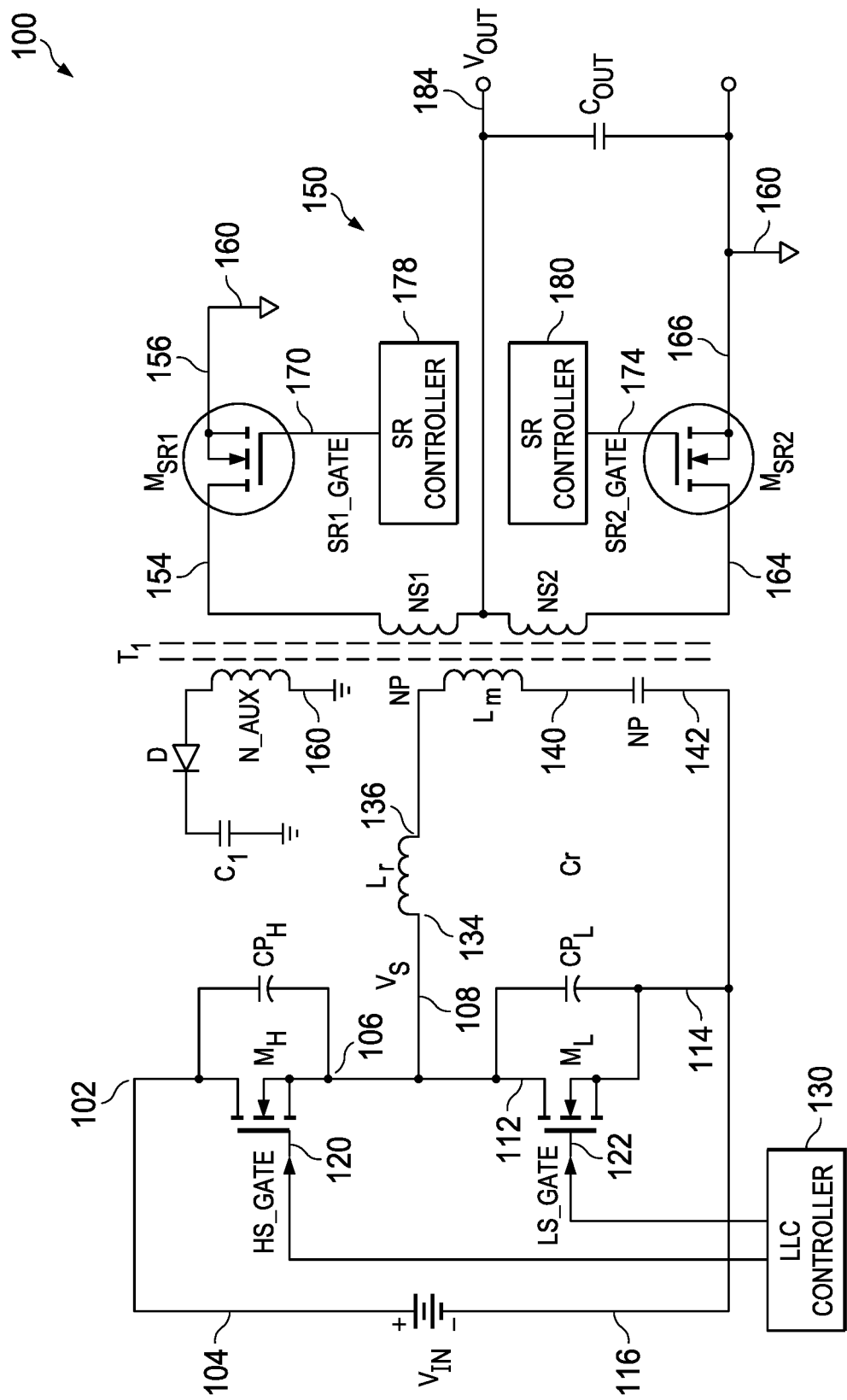
FIG. 1 is a schematic diagram of a resonant converter of an example embodiment.

FIG. 1 is a schematic diagram of a resonant converter 100 of an example embodiment. The resonant converter 100 includes a high-side transistor $M_H$ which has a first terminal 102 coupled to a positive voltage terminal 104 and has a second terminal 106 coupled to a switching terminal 108 (also referred to as the switching node). The converter 100 includes a low-side transistor $M_L$ which has a first terminal 112 coupled to the switching terminal 108 and has a second terminal 114 coupled to a negative input voltage terminal 116. The transistors $M_H$ and $M_L$ have respective parasitic capacitances $C_{PH}$ and $C_{PL}$. The positive voltage terminal 104 can be coupled to a positive terminal of an input voltage Vin and the negative voltage terminal 116 can be coupled to a negative terminal of the input voltage Vin.

The transistors $M_H$ and $M_L$ have respective gate terminals 120 and 122. A first controller 130 applies a high-side gate signal HS_Gate to the gate terminal 120 to turn on/off $M_H$ and applies a low-side gate signal LS_Gate to the gate terminal 122 to turn on/off $M_L$. In an example embodiment, HS_Gate and LS_Gate are frequency modulated rectangular wave pulses.

The resonant converter 100 can be operated in a burst mode which has a burst period and a burst interval period. In the burst period, the transistors $M_H$ and $M_L$ are operated in a complementary way, i.e., when $M_H$ is on, $M_L$ is off, and vice versa, and in the burst interval period, the transistors $M_H$ and $M_L$ are both turned off.

The resonant converter 100 has a resonant tank circuit formed by an inductor $L_r$, a capacitor $C_r$, and a magnetizing inductance $L_m$ of a transformer T1. The inductor $L_r$ may be an external inductor or may be a leakage inductance of the transformer T1. The transformer T1 has a primary winding NP, two secondary windings NS1 and NS2, and an auxiliary winding N_AUX. The inductor $L_r$ has a first terminal 134 coupled to the switching terminal 108 and a second terminal 136 coupled to a first end of the primary winding NP. The capacitor Cr has a first terminal 140 coupled to a second end of the primary winding NP and has a second terminal 142 coupled to the negative voltage terminal 116.

A synchronous rectifier 150 coupled to the second side of T1 rectifies AC current on the secondary side of T1 and provides a regulated output voltage $V_{out}$. The synchronous rectifier 150 has a first transistor $M_{SR1}$ which has a first terminal 154 coupled to a first end of the secondary winding NS1 and has a second terminal 156 coupled to a ground terminal 160. The synchronous rectifier 150 has a second transistor $M_{SR2}$ which has a first terminal 164 coupled to a first end of the secondary winding NS2 and has a second terminal 166 coupled to the ground terminal 160.

The transistors $M_{SR1}$ and $M_{SR2}$ have respective gate terminals 170 and 174. A first synchronous rectifier (SR) controller 178 applies a gate signal SR1_Gate to the gate terminal 170 to turn on/off the transistor $M_{SR1}$, and a second SR controller 180 applies a gate signal SR2_Gate to the gate terminal 174 to turn on/off the transistor $M_{SR2}$. The secondary windings NS1 and NS2 have second ends interconnected to form a center tap which also provides an output terminal 184 at which Vout is provided. In other embodiments, the rectifier 150 may be configured as a full bridge rectifier. A capacitor $C_{out}$ is coupled between the output terminal 184 and the ground terminal 160, and a load represented by a resistor $R_L$ is coupled between the output terminal 184 and the ground terminal 160. The ground terminal 160 can be coupled to a ground voltage level.

In an example embodiment, the transistor $M_H$ is an n-channel field effect transistor (NFET) which has a drain (terminal 102), a source (terminal 106) and the gate 120. The transistor $M_L$ is an NFET which has a drain (terminal 112), a source (terminal 110) and the gate 122. The transistor $M_{SR1}$ is an NFET which has a drain (terminal 144), a source (terminal 148) and the gate 158. The transistor $M_{SR2}$ is an NFET which has a drain (referred to as the terminal 150), a source (referred to as the terminal 154) and the gate 160.

The resonant converter 100 provides an auxiliary voltage supply V_AUX by rectifying current from the auxiliary winding N_AUX of the transformer T1. The auxiliary winding N_AUX has a first end coupled to the anode of a diode D and has a second end coupled to the ground terminal 148. A capacitor C1 is coupled between the cathode of the diode D and the ground terminal 160. The diode D provides a rectified current for charging C1 and to maintain the auxiliary voltage supply V_AUX. The auxiliary voltage supply V_AUX may provide power to the controllers 130, 178 and 180.

When $M_H$ is on and $M_L$ is off, +Vin is coupled to the switching terminal 108. As a result, the current rises through the inductor Lr and flows through the primary winding NP of T1 and charges the capacitor Cr. When $M_L$ is on and $M_H$ is off, the switching terminal 108 is coupled to −Vin. The capacitor Cr is discharged through $M_L$, reversing the direction of the current through the primary winding NP and the inductor Lr. As a result, a varying magnetic flux is produced in T1's core which induces voltages VS1, VS2 and V_AUX across NS1, NS2 and N_AUX, respectively.

When $M_H$ is on, due to the polarities of the induced voltages VS1, VS2 and V_AUX, the transistor $M_{SR2}$ is forward biased but the transistor $M_{SR1}$ and the diode D are both reverse biased. As a result, current flows through the internal body diode (not shown in FIG. 1) of $M_{SR2}$ to ground, which causes a voltage drop across the transistor $M_{SR2}$. In response to the voltage drop across $M_{SR2}$, the controller 180 turns on $M_{SR2}$, thus allowing the current to flow through $M_{SR2}$ to ground.

When $M_L$ is on, the polarities of VS1, VS2 and V_AUX are reversed. Thus, the transistor $M_{SR2}$ is reverse biased but the transistor $M_{SR1}$ and the diode D are both forward biased. As a result, current flows through the internal body diode (not shown in FIG. 1) of $M_{SR1}$, which causes a voltage drop across the transistor $M_{SR1}$. In response to the voltage drop across $M_{SR1}$, the controller 178 turns on $M_{SR1}$, thus allowing the current to flow through $M_{SR1}$ and charge the capacitor Cout. The forward-biased diode D rectifies the current flowing out of the auxiliary winding N_AUX to charge C1.

In ideal conditions, when $M_L$ is turned on and $M_{SR1}$ is conducting, the voltage across the secondary winding NS1 of the transformer T1 (i.e., between terminals 154 and 184) is Vout. As a result, a reflected voltage—(Np/Ns)*Vout (Np/Ns is the turns ratio of the primary to secondary turns of the transformer T1) is imposed on the primary winding of T1 (i.e., between terminals 136 and 140). The voltage across the inductor Lr is Vcr−(Np/Ns)*Vout (Vcr is the voltage across the capacitor Cr). Under light load conditions, when the resonant converter 100 operates in a burst mode, the synchronous rectifier controllers 178 and 180 may continue to switch during the burst interval period as the operation of controllers 130, 178 and 180 are not synchronized. Consider, for example, $M_L$ is turned on after $M_{SR2}$ is turned on and $M_L$ is turned on while $M_{SR2}$ is on. When $M_{SR2}$ is on, a voltage n*Vout is imposed on the primary winding of the transformer T1 (i.e., between terminal 136 and 140). If $M_L$ is turned on while MSR2 is on, the voltage across the inductor Lr is n*Vout+Vcr (instead of Vcr−n*Vout in the ideal case). The increased voltage across Lr causes a sharp rise of the transient current through the inductor Lr when the first pulse of a burst packet appears. Generally, when the second pulse of the burst packet appears, the controllers 178 and 180 start to operate properly and this condition is removed. The sharp rise of the transient current and subsequent settling down causes audible noise in the transformer T1 and the inductor Lr. In some cases, the transient current in the inductor Lr at the first pulse can be very high, which can damage $M_L$ and $M_{SR2}$.

To prevent a sharp rise of the transient current through Lr, it is desirable to synchronize the first pulse of the burst packet with the state of $M_{SR1}$ and $M_{SR2}$. Before the $M_L$ is turned on for the first time in a burst packet, it is necessary to ensure that $M_{SR2}$ is not turned on. After the first pulse, the controllers 178 and 180 maintain correct operation of $M_{SR1}$ and $M_{SR2}$.

If output current demand of the resonant converter 100 falls during operation, the switching frequency of $M_H$ and $M_L$ is increased to reduce the output power. However, during prolonged low output current condition (i.e., low-load condition), the required switching frequency may become impractical and will typically cause a drop in efficiency due to increases in switching losses and the drop in output power. For these reasons, the burst mode is employed in low-load conditions during which the output voltage is maintained by generating a burst of pulses to restart oscillation of the resonant tank circuit at a level sufficient to re-charge the output capacitor $C_{out}$. The burst of pulses may be generated at predetermined intervals according to the minimum burst size and burst interval required to supply current to maintain the desired output voltage $V_{out}$. Between the burst periods, the capacitor $C_{out}$ supplies current to the load $R_L$.

In an example embodiment, the converter 100, or some parts of the converter 100, may be implemented as an integrated circuit (IC) on a semiconductor die or on an IC package.

Figure 2:
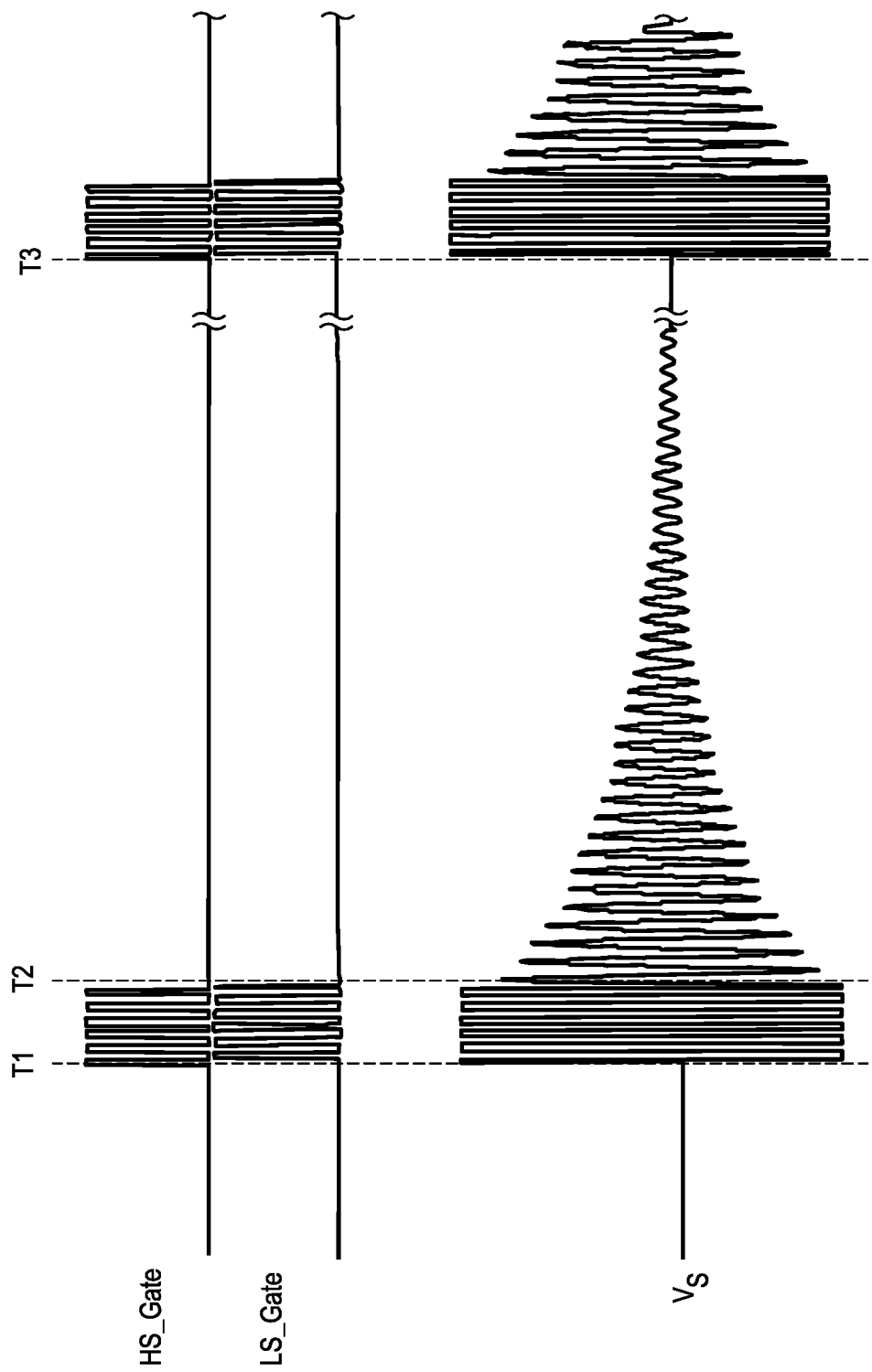
FIG. 2 is a timing diagram of the burst mode operation of the resonant converter.

FIG. 2 is a timing diagram illustrating an example burst mode operation of the resonant converter 100. At time T1, a burst period commences and the controller 130 generates the high-side gate signal HS_Gate comprising a plurality of pulses to control the high-side transistor $M_H$ and generates the low-side gate signal LS_Gate comprising a plurality of pulses to control the low-side transistor $M_L$. When $M_H$ is on, a voltage Vs at the switching node 108 is forced to the positive input level +Vin, and when $M_L$ is on, the voltage Vs at the switching node 108 is forced to the negative in level −Vin. At time T2, the burst ends and the voltage Vs is no longer forced to +Vin and −Vin by $M_H$ and $M_L$, but is generated by the ringing of the resonant tank. Due to the ringing of the resonant tank during the burst interval period, a varying magnetic flux is produced in T1's core which induces voltages across the secondary windings NS1 and NS2. At time T3, the next burst period starts. Although $M_H$ and $M_L$ are not switched during the burst interval (i.e., between T2 and T3), the resonant tank generates a ringing current which produces a varying magnetic flux in the transformer T1's core. As a result, voltages are induced across the secondary windings NS1 and NS2, which cause the body diodes (not shown in FIG. 1) of $M_{SR1}$ and $M_{SR2}$ to conduct. As the body diode of $M_{SR1}$ conducts, the controller 178 turns on $M_{SR1}$, which causes the current to flow through $M_{SR1}$. When $M_{SR1}$ conducts, it causes current to flow into the resonant tank which further sustains ringing. Similarly, as the body diode of $M_{SR2}$ conducts, the controller 180 turns on $M_{SR2}$, which causes the current to flow through $M_{SR2}$. Thus, although $M_H$ and $M_L$ are both turned off during the burst interval period, the controllers 170 and 180 turn on $M_{SR1}$ and $M_{SR2}$, respectively.

Because, the controllers 178 and 180 turn on/off $M_{SR1}$ and $M_{SR2}$ during the burst interval period independent of $M_H$ and $M_L$, when the first pulse of the next burst packet appears, it is difficult to synchronize the on/off periods of $M_L$ with $M_{SR2}$ and the on/off periods of $M_H$ with $M_{SR1}$. This is because when $M_L$ is turned on to start of a burst period, $M_{SR2}$ may already have been turned on by the controller 180 during the burst interval period due to the ringing of the resonant tank circuit. Similarly, when $M_H$ is turned on, $M_{SR1}$ may have already been turned on by the controller 170 during the burst interval period in response to the ringing of the resonant tank circuit.

In an example embodiment, the start of the first pulse in the burst period is controlled based on the polarity of the auxiliary voltage V_AUX. Depending on the conduction state (i.e., on/off) of $M_{SR2}$ and $M_{SR1}$, a delay may be applied to the first pulse when the burst period commences after the burst interval period. By applying the delay to the start of the first pulse in the burst period, the timing of the first pulse is controlled.

Figure 3:
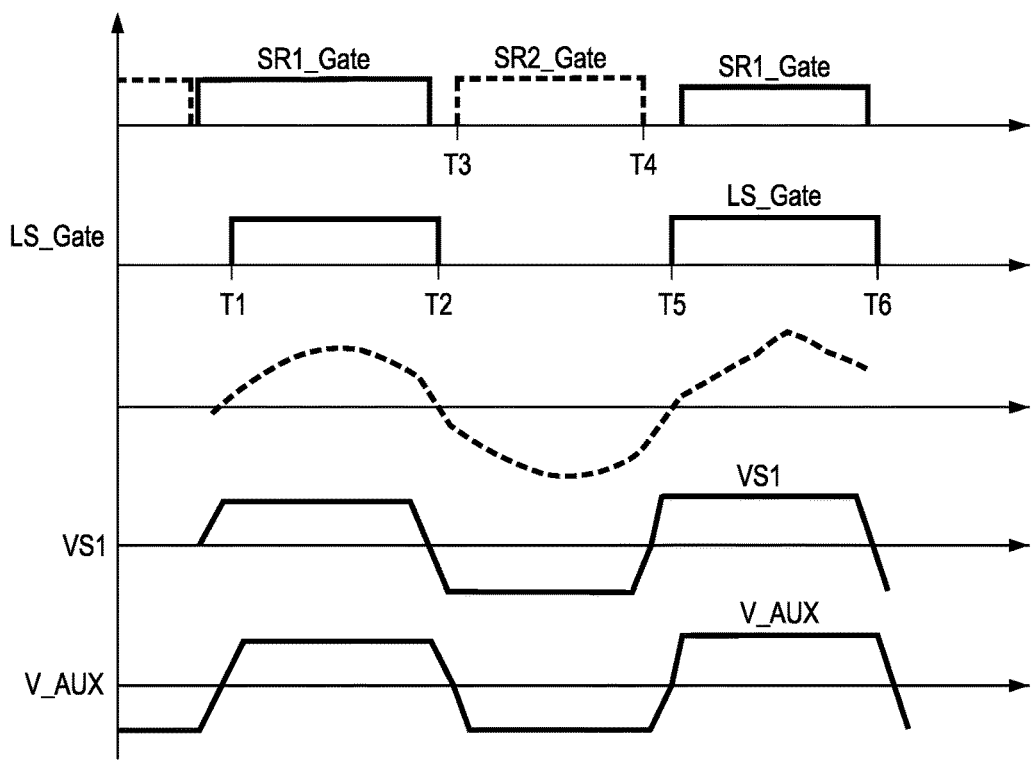
FIGS. 3-4 are timing diagrams of waveforms of the resonant converter.

FIG. 3 is a timing diagram which illustrates how the conduction state (i.e., on/off) of $M_{SR2}$ and $M_{SR1}$ are determined. At time T1, the gate signal LS_Gate is applied to turn on the low-side transistor $M_L$, which causes the body diode of $M_{SR1}$ to be forward biased and to conduct. The effect of this is the voltage VS1 across the secondary winding NS1 and the voltage V_AUX across the auxiliary winding both transition to the positive half-cycle. At time T2 the gate signal LS_Gate is removed to turn off $M_L$. At time T3, a gate signal SR2_Gate is applied to turn on the transistor $M_{SR2}$ and at time T4, the gate signal SR2_Gate is removed to turn off $M_{SR2}$. During the burst interval, because $M_L$ and $M_H$ are not switched, the voltage V_AUX is influenced only by the switching of $M_{SR1}$ and $M_{SR2}$. When $M_{SR1}$ is on, the voltage V_AUX is positive and when $M_{SR2}$ is on, the voltage V_AUX is negative.

At time T5, the gate signal LS_Gate is again applied to turn on $M_L$, and at time T6 the LS_Gate is removed to turn off $M_L$. In the interval period between T2 and T5, the high-side transistor $M_H$ is turned on by applying a gate signal HS_Gate (not shown in FIG. 3).

In ideal operating condition, when the voltages VS1 and V_AUX are in the positive half-cycles, the inductor current $I_L$ follows a sinusoidal path in the positive half-cycle, and when VS1 and V_AUX are in the negative half-cycles, the inductor current $I_L$ follows a sinusoidal path in the negative half-cycle. From FIG. 3, in ideal operating condition during the negative half-cycle period of V_AUX, SR2_Gate is applied by the controller 180, and during the positive half-cycle of V_AUX, SR1_Gate is applied by the controller 178. Thus, the polarity of V_AUX indicates when $M_{SR2}$ and $M_{SR1}$ are turned on by their respective controllers. Therefore, the polarity of V_AUX can be used to determine whether $M_{SR1}$ or $M_{SR2}$ is turned on or off.

Figure 4:
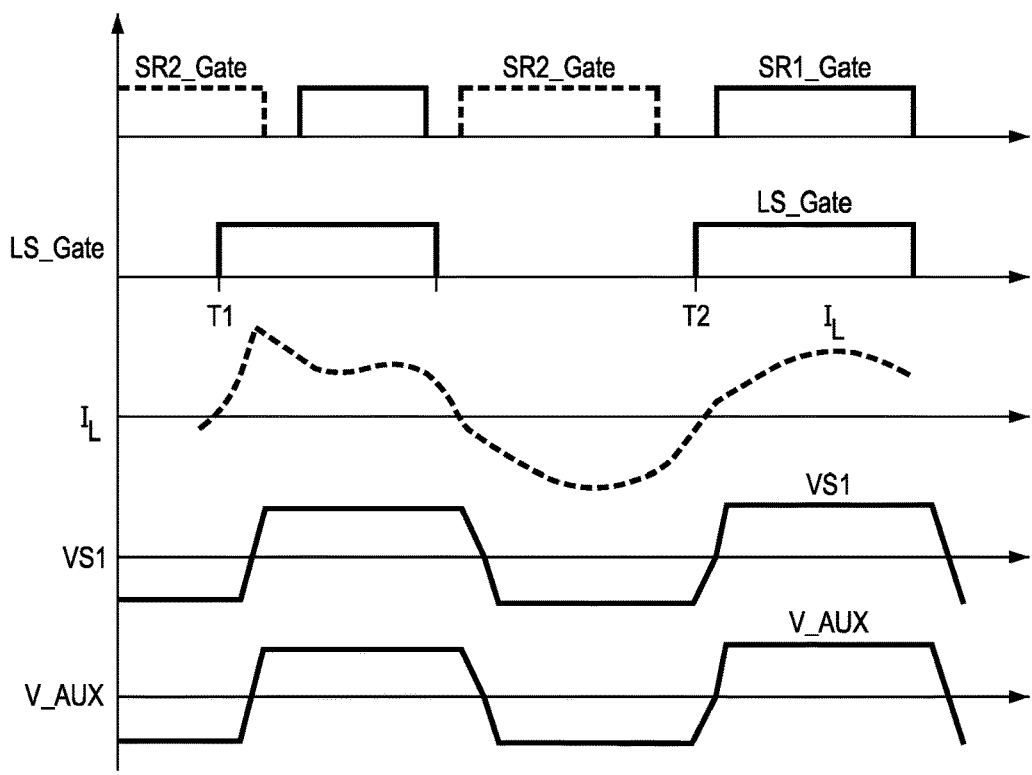

FIG. 4 is a timing diagram which illustrates how the on/off periods of $M_L$ and $M_H$ are synchronized with the conduction states of $M_{SR1}$ and $M_{SR2}$. Consider, at time T1, a gate signal LS_Gate is applied to turn on the low-side transistor $M_L$. However at time T1, the voltage V_AUX across the auxiliary winding is in the negative half-cycle, which indicates $M_{SR2}$ is already turned on because SR2_Gate is being applied. If $M_L$ is turned on while $M_{SR2}$ is also on, the current $I_L$ through the inductor Lr will spike higher which may damage $M_L$ and the transformer T1. Thus, the controller 130 does not apply LS_Gate at time T1. Instead, the controller 130 delays LS_Gate until time T2 when V_AUX has transitioned to the positive half-cycle, thus indicating $M_{SR2}$ has been off because Gate_SR2 is removed. When the controller 130 applies Gate_LS at time T2 to turn on $M_L$, the current $I_L$ rises on a sinusoidal path without a spike. Thus, the polarity of V_AUX is used to operate the resonant converter 100 safely.

Figure 5:
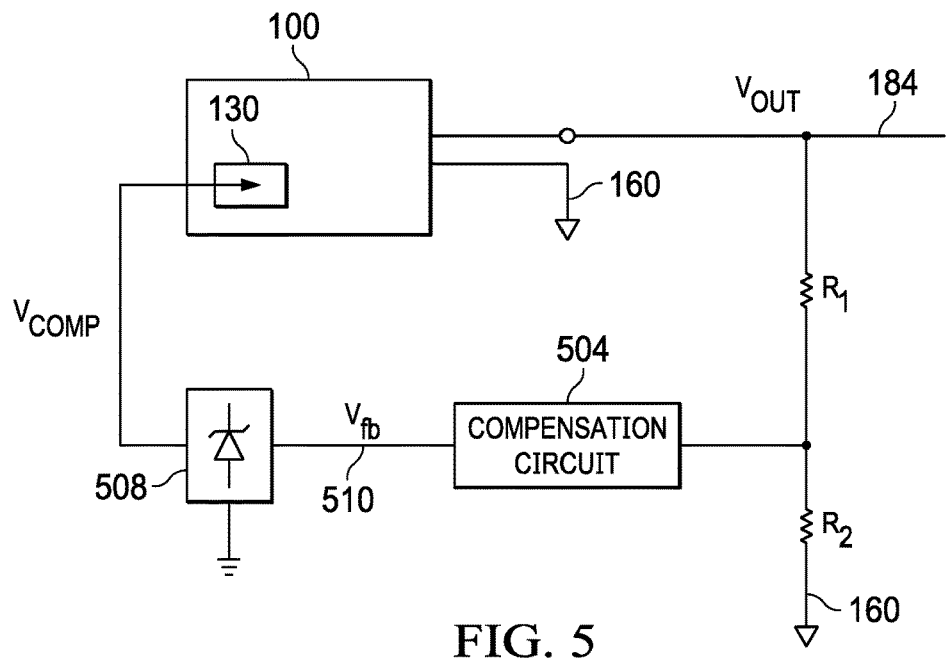
FIG. 5 is a block diagram of the resonant converter coupled to a optical feedback network.

In an example embodiment, the burst period and the burst interval period may be determined by estimating the output power demand of the resonant converter. FIG. 5 is a block diagram 500 which illustrates the resonant converter 100 coupled to an optical feedback network which provides an estimate of the output power demand to the controller 130 which controls the on/off periods of $M_H$ and $M_L$. A voltage divider comprising resistors R1 and R2 is coupled to the output terminal 184. A compensation circuit 504 has an input 506 coupled to the voltage divider. The compensation circuit 504 receives a voltage which is proportional to the output voltage Vout. The compensation circuit 504 provides a feedback signal Vfb which is an estimate of the output power demand. An optical isolator 508 has an input 510 coupled to receive the feedback signal Vfb. The compensation circuit 504 provides a signal Vcomp which is an estimate of the output power demand. Vcomp is applied to the controller 130. If Vcomp is high (i.e., high output power demand), the controller 130 increases the burst period and decreases the burst interval period in order to deliver more output power. Conversely, if Vcomp is low (i.e., low output power demand), the controller 130 decreases the burst period and increases the burst interval period to reduce output power.

Figure 6:
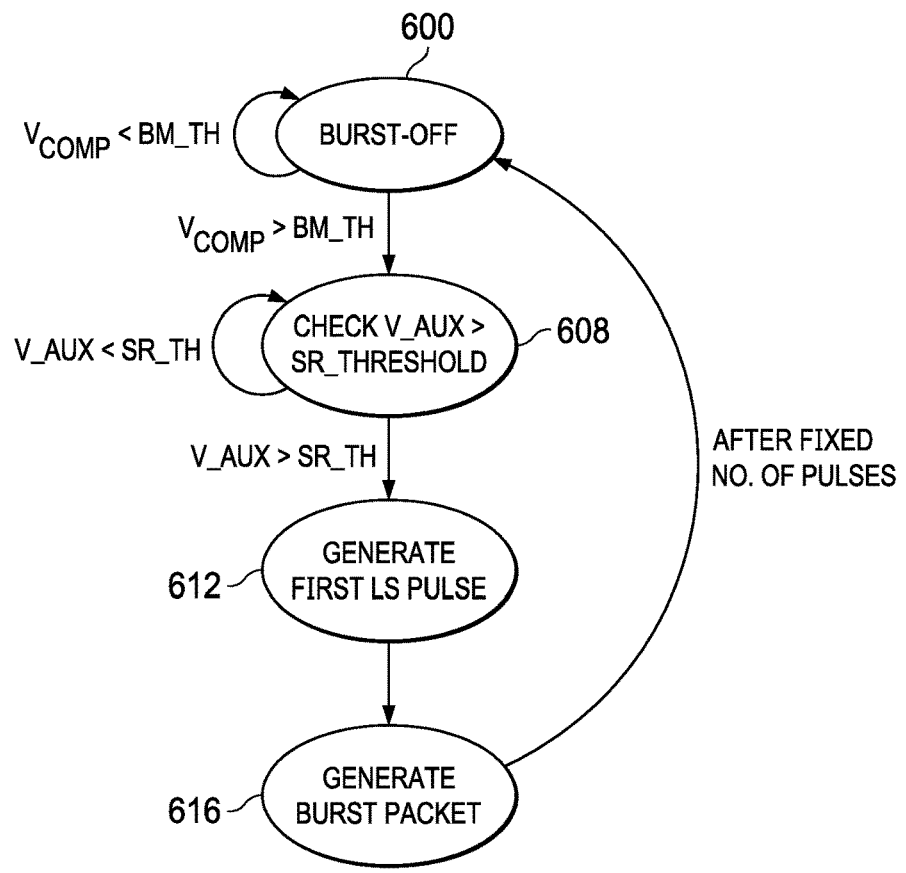
FIG. 6 is a state diagram of various states of the resonant converter.

FIG. 6 is a state diagram 600 of various states of an operation of the resonant converter 100. The state diagram 600 shows how the low-side switch $M_L$ is turned on based on the polarity of the auxiliary voltage V_AUX. The transition from a state to a next state may be implemented by a finite state machine, a general purpose processor, a microcontroller, an ASIC or by software.

Initially, in state 604 the resonant converter 100 is in a burst interval period in which bursts are not generated. A voltage $V_{comp}$ which represents an estimate of output power demand is measured or otherwise determined. $V_{comp}$ may be measured using an optical-isolator which is coupled to the output terminal 170 via a voltage divider. The voltage $V_{comp}$ is compared to a first threshold voltage (referred to as a burst mode threshold BM_TH). BM_TH may be determined based on a target or desired output voltage. If $V_{comp}$ is less than BM_TH, the resonant converter 100 is held in state 604 and thus remains in the burst interval period. If $V_{comp}$ is greater than or equal to BM_TH, the resonant converter 100 transitions to state 608.

In state 608, the polarity of the auxiliary voltage V_AUX is determined. In an example embodiment, V_AUX is compared to a second threshold voltage (referred to as SR threshold SR_TH). As an example, SR_TH may be set at 100 mV and V_AUX may be measured using an optical coupler or a voltage divider. If V_AUX is greater than the SR_TH, V_AUX is determined to be in the positive half-cycle, which indicates that the switch $M_{SR2}$ is already turned on. As discussed before, if $M_{SR2}$ is turned on, it is unsafe to turn on the low-side switch $M_L$, and accordingly the resonant converter 100 is held in state 608 by delaying the start of the pulse of the next burst period and the controller 130 does not enable LS_Gate. After a predetermined delay period, V_AUX is again compared to SR_TH.

If V_AUX is less than or equal to SR_TH, V_AUX is determined to be in the negative half-cycle, which indicates that $M_{SR2}$ is turned off and thus $M_L$ can be safely turned on. The resonant converter 100 transitions to state 612 in which the controller 130 generates the first pulse (i.e., LS_Gate) of a burst packet. Thereafter, the resonant converter 100 transitions to state 616 in which $V_{comp}$ is compared to a third threshold voltage (referred to as an over voltage protection limit OVP_LIM). If $V_{comp}$ is greater than OVP_LIM, a determination is made that the output voltage $V_{out}$ exceeds an over voltage protection limit. The resonant converter 100 returns to state 604 and enters the burst interval period.

If Vcomp is less than or equal to OVP_LIM, the next burst is generated and Vcomp is again compared to OVP_LIM. The process is repeated until a fixed number of bursts comprising the burst packet is generated, and thereafter the resonant converter 100 returns to state 604.

In this description, the term "couple" may cover connections, communications, or signal paths that enable a functional relationship consistent with this description. Also, in this description, a device that is configured to perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device or other electronics or semiconductor component.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground terminal" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means +/−10 percent of the stated value.

Modifications are possible in the described embodiments, and other embodiments are possible, within the scope of the claims.

What is claimed is:

1. A method for operating a resonant converter in a burst mode, the method comprising:
    determining a polarity of a transformer voltage across a secondary winding of a transformer;
    determining, from the polarity of the transformer voltage, an on/off state of first and second transistors coupled to the secondary winding of the transformer; and
    commencing a burst period by alternately turning on/off a high-side transistor and a low-side transistor in response to the transformer voltage having a first polarity, wherein the high-side transistor and the low-side transistor are being coupled to a primary winding of the transformer; and
    holding the resonant converter in a burst interval by delaying a start of a first pulse of the burst period in response to the transformer voltage having a second polarity, wherein the high-side transistor and the low-side transistor are turned off during the burst period.

2. The method of claim 1, further comprising:
    turning on the low-side transistor with the second transistor turned off, and subsequently turning off the low-side transistor prior to turning on the second transistor; and
    turning on the high-side transistor with the first transistor turned off, and subsequently turning off the high-side transistor prior to turning on the first transistor.

3. The method of claim 1, wherein the transformer voltage has a first polarity while the transformer voltage is in a positive half-cycle and has a second polarity while the transformer voltage is in a negative half cycle.

4. The method of claim 1, wherein the first and second transistors are connected to the secondary winding of the transformer in a synchronous rectifier configuration.

5. A method for operating a resonant converter in a burst mode, the method comprising:
    determining a first voltage that represents an output power delivered by the resonant converter;
    comparing the first voltage to a burst threshold voltage that represents a target output power;
    determining a polarity of a transformer voltage across a secondary winding of a transformer in response to the first voltage being less than the burst threshold voltage;
    determining, from the polarity of the transformer voltage, an on/off state of first and second transistors coupled to the secondary winding of the transformer; and
    commencing a burst period by alternately turning on/off a high-side transistor and a low-side transistor in response to the transformer voltage having a first polarity, wherein the high-side transistor and the low-side transistor are electrically connected to a primary winding of the transformer.

6. The method of claim 5, further comprising holding the resonant converter in a burst interval by delaying a start of a first pulse of the burst period in response to the transformer voltage having a second polarity.

7. The method of claim 5, further comprising holding the resonant converter in a burst interval in response to the first voltage being greater than the burst threshold voltage.

8. The method of claim 5, further comprising:
    comparing an output voltage to an over-voltage protection threshold when the resonant converter is in the burst period;
    transitioning the resonant converter from the burst period to a burst interval in response to if the output voltage being greater than the over-voltage protection threshold; and
    holding the resonant converter in the burst interval in response to the output power being less than or equal to the over-voltage protection threshold.

9. The method of claim 5, further comprising transitioning the resonant converter from the burst period to a burst interval after a certain number of bursts.

10. A method for operating a resonant converter in a burst mode, the method comprising:
    determining a first voltage that represents an output power delivered by the resonant converter;
    comparing the first voltage to a burst threshold voltage that represents a target output power;
    determining a polarity of a transformer voltage across a secondary winding of a transformer in response to the first voltage being less than the burst threshold voltage;
    commencing a burst period by alternately turning on/off a transistor electrically connected to a primary winding of the transformer in response to the transformer voltage having a first polarity;
    holding the resonant converter in a burst interval by delaying a start of a first pulse of the burst period in response to the transformer voltage having a second polarity; and
    holding the resonant converter in the burst interval in response to the first voltage being greater than the burst threshold voltage.

11. The method of claim 10, wherein the transistor is a low-side transistor.

12. The method of claim 10, wherein the transformer voltage has a first polarity while the transformer voltage is in a positive half-cycle and has a second polarity while the transformer voltage is in a negative half cycle.

13. A method for operating a resonant converter in a burst mode, the method comprising:
    determining a first voltage that is represents an output power delivered by the resonant converter;
    comparing the first voltage to a burst threshold voltage that represents a target output power;
    determining a polarity of a transformer voltage across a secondary winding of a transformer in response to the first voltage being less than the burst threshold voltage;
    commencing a burst period by alternately turning on/off a high-side transistor and a low-side transistor in response to the transformer voltage having a first polarity, wherein the high-side transistor and the low-side transistor are electrically connected to a primary winding of the transformer;
    holding the resonant converter in a burst interval by delaying a start of a first pulse of the burst period in response to the transformer voltage having a second polarity; and
    holding the resonant converter in the burst interval in response to the first voltage being greater than the burst threshold voltage.

14. The method of claim 13, further comprising:
comparing an output voltage to an over-voltage protection threshold while the resonant converter is in the burst period;
transitioning the resonant converter from the burst period to the burst interval responsive to the output voltage being greater than the over-voltage protection threshold; and
holding the resonant converter in the burst interval responsive to the output power being less than or equal to the over-voltage protection threshold.

15. The method of claim 13, further comprising transitioning the resonant converter from the burst period to the burst interval following a certain number of bursts.

* * * * *